(No Model.) 2 Sheets—Sheet 1.

L. H. CLAUSEN.
COFFEE ROASTER.

No. 307,843. Patented Nov. 11, 1884.

Witnesses,
Geo. E. Paine.
C. J. Bell.

Inventor,
Lorenz Heinrich Clausen
By Paine & Ladd,
Att'ys.

(No Model.)

2 Sheets—Sheet 2.

L. H. CLAUSEN.
COFFEE ROASTER.

No. 307,843. Patented Nov. 11, 1884.

Witnesses,
C. J. Belt,
Geo. E. Paine

Inventor,
Lorenz Heinrich Clausen
By Paine & Todd,
Att'ys.

United States Patent Office.

LORENZ HEINRICH CLAUSEN, OF HAMBURG, GERMANY.

COFFEE-ROASTER.

SPECIFICATION forming part of Letters Patent No. 307,843, dated November 11, 1884.

Application filed February 25, 1884. (No model.)

*To all whom it may concern:*

Be it known that I, LORENZ HEINRICH CLAUSEN, a subject of the German Emperor, and a resident of Hamburg, in the German Empire, have invented certain new and useful Improvements in Machines for Roasting Coffee, of which the following is a specification.

My invention relates to improvements in machines for roasting coffee; and the objects of my improvements are, first, to employ the fire used for heating the coffee drum or drums simultaneously for heating a boiler, which generates the steam for an engine rotating the coffee drum or drums; second, to provide means for regulating the heat acting upon the boiler, as well as upon the coffee drum or drums; and, third, to facilitate inspecting the coffee while roasted within the drum without opening the same. I attain these objects by the mechanism illustrated by the accompanying drawings, in which—

Figure 1:
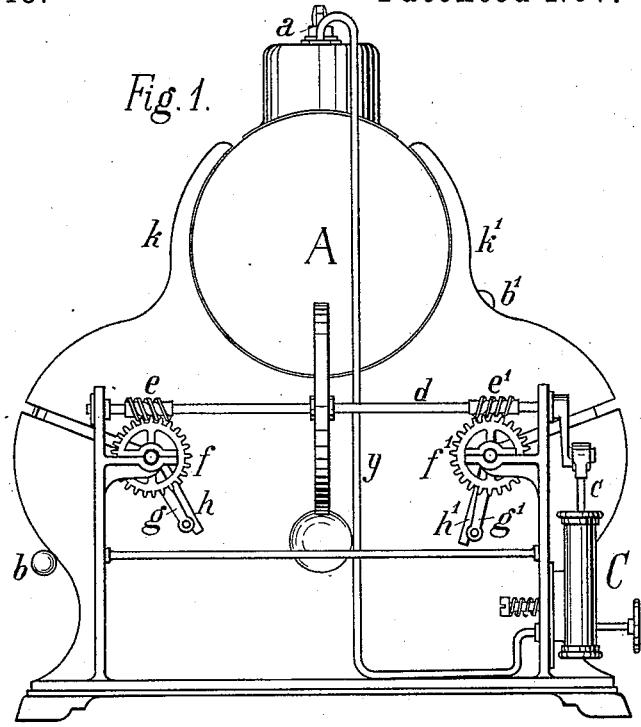
Figure 2:
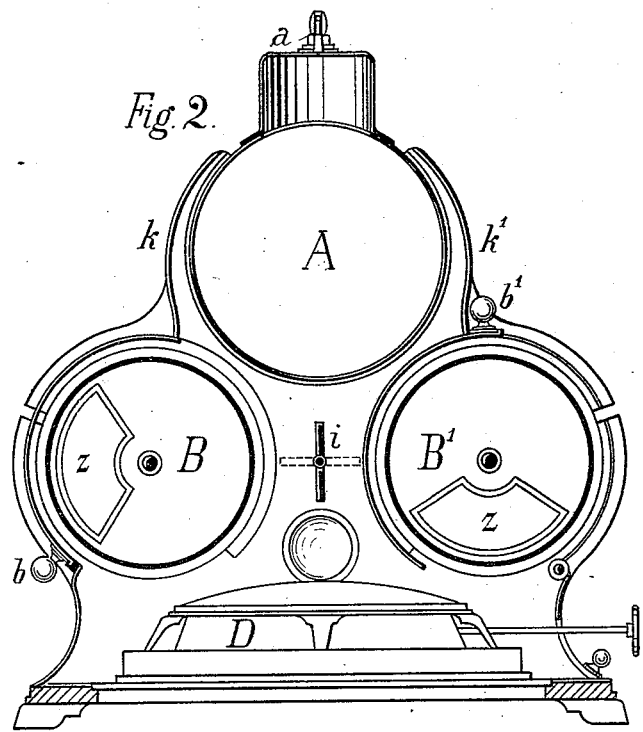
Figure 3:
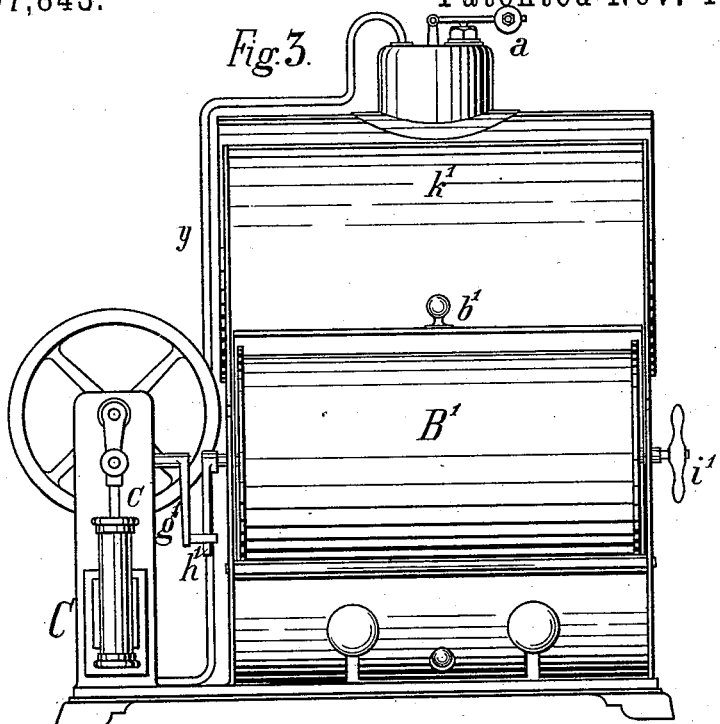
Figure 4:
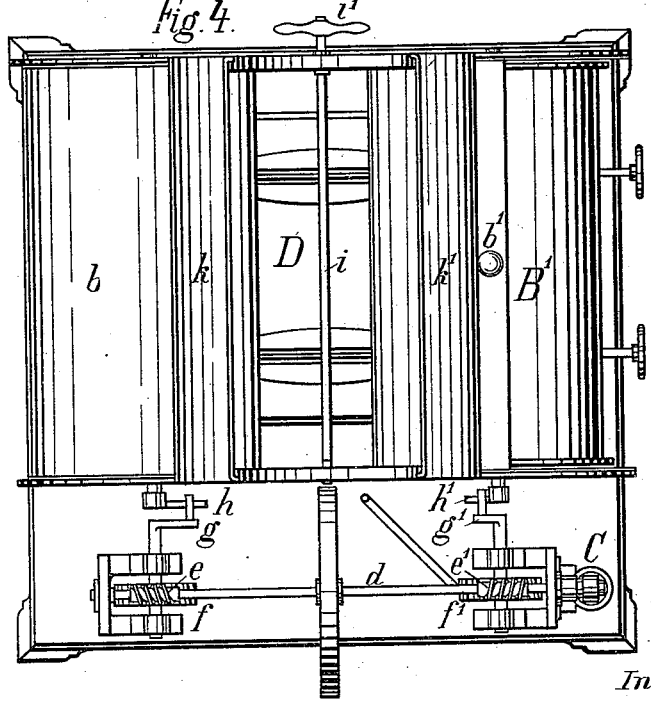

Figure 1 is a front elevation of an automatic coffee-roaster constructed according to my invention. Fig. 2 is a vertical section thereof. Fig. 3 is a side elevation, and Fig. 4 is a plan, of the apparatus with the boiler removed therefrom.

Similar letters refer to similar parts throughout the several views.

A is a boiler, which is heated by a lamp, D, arranged at the bottom of the apparatus. Such lamp may be suitably replaced by any other source of heat—for instance, a coal or wood fire, &c. The boiler A supplies steam through the pipe $y$ to the engine C, the piston-rod $c$ of which rotates the crank-shaft $d$. The latter is provided with two worms, $e$ and $e'$, engaging into worm-wheels $f$ and $f'$, which, by means of cranks $g$ and $g'$, turn the removable coffee-drums B and B', the bearings of which are arranged beyond the boiler A at both sides of the lamp D. Thus the same source of heat which causes the production of steam in the boiler A performs the roasting of the coffee contained in the drums B and B'. The latter are rotated by means of arms $h$ and $h'$ engaging into the cranks $g$ and $g'$. The coffee, while roasted, may be inspected through the openings $z$, covered with mica plates. The boiler A is provided with a safety-valve, $a$.

For regulating the supply of heat to the boiler A and the drums B and B', there is a pivoted plate, $i$, which may be manipulated by the lever $i'$, and which will, according to its horizontal or vertical position, prevent or allow the flame of the lamp D or other source of heat to touch the boiler directly, while the semicircular covers $b$ and $b'$, which slide in semicircular guides at the front and back plate of the apparatus, close in their normal position (as shown by the cover $b$) the shell $k$ of the apparatus, and may be pushed backward (as illustrated by $b'$) in order to protect the drums from the direct heat, and simultaneously allow them to be taken out.

Having thus fully described my invention, what I desire to claim and secure by Letters Patent is—

1. The combination, in an apparatus for roasting coffee, of a supporting-frame, a boiler supported at or near the top of said frame and connected with a steam-engine, coffee-drums arranged below said boiler to form between them a vertical heat-passage to the boiler, and appliances and connections for causing said engine to rotate said drums, substantially as set forth.

2. In an apparatus for roasting coffee, the combination of the boiler A, coffee-drums arranged below the same to present a vertical heat-passage, and the pivoted plate $i$, with the lamp D, or other source of heat, substantially as and for the purpose specified.

3. In an apparatus for roasting coffee, the combination of the drums B and B' and semicircular covers $b$ and $b'$ with the lamp D, or other source of heat, substantially as and for the purpose specified.

In testimony that I claim the foregoing as my invention I have signed my name, in presence of two witnesses, this 28th day of January, 1884.

LORENZ HEINRICH CLAUSEN.

Witnesses:
ALEXANDER SPECHT,
DIEDRICH PETERSEN.